(12) United States Patent
Dickinson et al.

(10) Patent No.: US 10,642,542 B1
(45) Date of Patent: May 5, 2020

(54) APPARATUS AND METHOD FOR CREATING MACHINE-READABLE CODES FOR CUSTOM CUT STOCK

(71) Applicant: Xerox Corporation, Norwalk, CT (US)

(72) Inventors: Charles Dickinson, Pittsford, NY (US); James E. Baxter, III, Canandaigua, NY (US); Valerie Parcero, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/249,508

(22) Filed: Jan. 16, 2019

(51) Int. Cl.
*G06F 3/12* (2006.01)
*G06Q 30/06* (2012.01)
*G06K 19/06* (2006.01)

(52) U.S. Cl.
CPC .......... *G06F 3/1205* (2013.01); *G06F 3/1258* (2013.01); *G06F 3/1284* (2013.01); *G06F 3/1297* (2013.01); *G06Q 30/0635* (2013.01); *G06K 19/06028* (2013.01); *G06K 19/06037* (2013.01)

(58) Field of Classification Search
CPC .......... H04N 1/00132; H04N 1/00167; H04N 1/00188; G06F 3/1205; G06F 3/1258; G06F 3/1284; G06F 3/1297; G06Q 30/0635; G06K 19/06028; G06K 19/06037
USPC ......................................... 358/1.1–1.18, 402
See application file for complete search history.

(56) References Cited

U.S. PATENT DOCUMENTS

| | | | | |
|---|---|---|---|---|
| 2004/0046797 | A1* | 3/2004 | Perry | G06F 3/1205 715/771 |
| 2005/0168775 | A1* | 8/2005 | Liu | H04N 1/00132 358/1.15 |
| 2010/0165407 | A1* | 7/2010 | Witkowski | B42D 15/02 358/1.18 |
| 2014/0067591 | A1* | 3/2014 | Schulman | G06Q 30/0621 705/26.5 |
| 2017/0323068 | A1* | 11/2017 | Dintenfass | G06Q 40/06 |

* cited by examiner

*Primary Examiner* — Gabriel I Garcia

(57) ABSTRACT

A method for creating a machine-readable code for a custom cut stock is disclosed. For example, the method is executed by a processor and includes receiving information associated with the custom cut stock, creating the machine-readable code for the custom cut stock, wherein the machine-readable code contains the information and at least one system setting of a printing device, and transmitting the machine-readable code to the printing device to automatically configure the printing device for the custom cut stock.

18 Claims, 5 Drawing Sheets

APPARATUS AND METHOD FOR CREATING MACHINE-READABLE CODES FOR CUSTOM CUT STOCK

The present disclosure relates generally to the creation of machine-readable codes and, more particularly, to creating machine-readable codes for custom cut stock.

BACKGROUND

Companies may load paper into a printing device. Various standard sizes of paper may be loaded into a printing device. For example, standard sizes may include 8.5 inches by 11 inches, 11 inches by 14 inches, legal size paper, and the like. In addition, the information related to the paper may be entered manually into a printer.

However, some companies may use custom cut stock or print media. As a result, a variety of different sizes of paper may be cut and delivered. However, in some cases it may be inefficient and tedious to have to repeatedly manually enter information associated with the custom cut stock into the printing device. In some instances, a user may not remember what print parameters were used for a custom cut stock during a previous print job.

SUMMARY

According to aspects illustrated herein, there are provided an a method and a non-transitory computer readable medium for creating a machine-readable code for a custom cut stock. One disclosed feature of the embodiments is a method that receives information associated with the custom cut stock, creates the machine-readable code for the custom cut stock, wherein the machine-readable code contains the information and at least one system setting of a printing device, and transmits the machine-readable code to the printing device to automatically configure the printing device for the custom cut stock.

Another disclosed feature of the embodiments is a non-transitory computer-readable medium having stored thereon a plurality of instructions, the plurality of instructions including instructions which, when executed by a processor, cause the processor to perform operations that receive information associated with the custom cut stock, create the machine-readable code for the custom cut stock, wherein the machine-readable code contains the information and at least one system setting of a printing device, and transmit the machine-readable code to the printing device to automatically configure the printing device for the custom cut stock.

Another disclosed feature of the embodiments is an apparatus comprising a processor and a computer-readable medium storing a plurality of instructions which, when executed by the processor, cause the processor to perform operations that receive information associated with the custom cut stock, create the machine-readable code for the custom cut stock, wherein the machine-readable code contains the information and at least one system setting of a printing device, and transmit the machine-readable code to the printing device to automatically configure the printing device for the custom cut stock.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses an apparatus and method for creating machine-readable codes for custom cut stock. As discussed above, some companies may use custom cut stock or print media. For example, print media of a standard size may be cut to a custom size by a converter and delivered to the customer in a generic packaging with no labels.

As a result, a user may have to repeatedly manually enter information associated with the custom cut stock into the printing device. In some instances, a user may not remember what print parameters were used for a custom cut stock during a previous print job.

The present disclosure creates machine-readable codes for the custom cut stock. The machine-readable code may be a bar code, a quick response (QR) code, and the like. The machine-readable code may be generated based on parameters associated with the custom cut stock. The machine-readable code may be generated and then applied to the packaging of the custom cut stock or placed in a book. As a result, each time the same custom cut stock is received, the machine-readable code may be scanned to obtain the characteristics of the custom cut stock.

In one example, the machine-readable code can be scanned at the printing device. The machine-readable code may also provide system level settings for the printing device. For example, the machine-readable code may be scanned to automatically set a fuser temperature, a speed of blowers, a feeding speed of the custom cut stock, and the like.

In addition, the machine-readable code can be generated by an apparatus in a centralized network that can communicate with other MFDs or other locations. As a result, a database of information can be kept as the machine-readable codes are scanned to share knowledge regarding which custom cut stock or print media may work best for certain print jobs.

Figure 1:
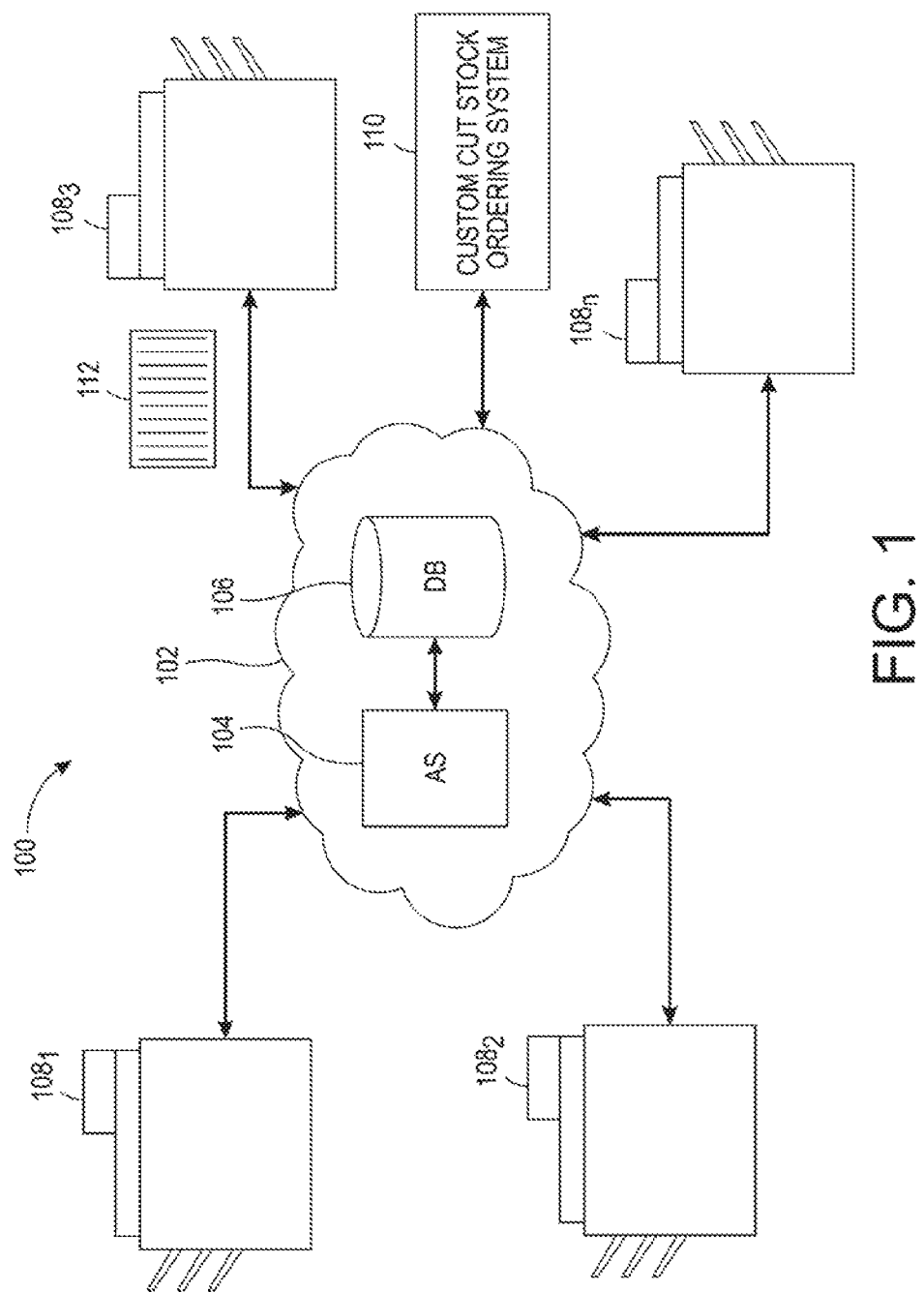
FIG. 1 illustrates a block diagram of a system of the present disclosure.

FIG. 1 illustrates an example system 100 to create a machine-readable code 112 for a custom cut stock. In one example, the system 100 may include a communication network 102 and a plurality of printing devices 108$_1$-108$_n$ (hereinafter referred to individually as a printing device 108 or collectively as printing devices 108).

In one embodiment, the printing devices 108 may be any type of printing device, such as a laser printer, an ink jet printer, an ultra-violet (UV) curable ink printer, and the like. The printing devices 108 may be located in different geographic locations. The printing devices 108 may be operated by a single company or different companies.

In one embodiment, the communication network 102 may be an Internet protocol (IP) network. The communication network 102 has been simplified for ease of explanation. The communication network 102 may include additional network elements that are not shown, such as a router, a gateway, a border element, one or more different access networks (e.g., a broadband network, a cellular network, and the like), a firewall, and the like.

In one embodiment, the communication network 102 may include an application server (AS) 104 and a database (DB) 106. The AS 104 and the DB 106 located in the communication network 102 may be also referred to as the "cloud." The printing devices 108 may be communicatively coupled to the AS 104 via the communication network 102. As a result, information, electronic data, and the like, may be exchanged between the AS 104 and any one of the printing devices 108. Although a single AS 104 and single DB 106 are illustrated in FIG. 1, it should be noted that multiple application servers and databases may be deployed in the communication network 102.

In one embodiment, the AS 104 may be modified to perform the functions described herein. For example, the AS 104 may generate the machine readable code 112 for custom cut stock used in the printing devices 108. For example, the printing devices 108 may print on custom cut stock. For example, custom sizes of stock, or print media, may be made for the printing devices 108. The desired parameters for the stock may be sent to a converter. The converter may cut the stock to the desired parameters and package the custom cut stock in a generic package.

The machine readable code 112 may be sent to a printing device 108 to be printed. The machine readable code 112 may then applied to the outside of the packaging of the custom cut stock or applied into a book. The machine readable code 112 may be scanned at the printing device 108 and parameters associated with the custom cut stock may be entered automatically into printing device 108. In other words, a user need not manually enter the parameters associated with the custom cut stock each time a package of the custom cut stock is opened and loaded into the printing device 108. Rather, the user may scan the machine readable code 112.

In one embodiment, the machine readable code 112 may be a bar code or a quick response code. The parameters associated with the custom cut stock may include information such as a manufacturer, a paper size, a finish, a coating, a grain, a weight, a color, an indication of any pre-printed images, an indication of pre-punched holes, and the like.

In one embodiment, the machine readable code 112 may also include system settings for the printing device associated with a print job that uses the custom cut stock. As discussed in further details below, the system settings may include a fuser temperature, a blower speed, a blower on time, a feeding speed of the custom cut stock, and the like.

In one embodiment, the system 100 may include a custom cut stock ordering system 110. In one example, the custom cut stock ordering system 110 may be communicatively coupled to the AS 104. When the custom cut stock for a printing device 108 is ordered through the custom cut stock ordering system 110, the information or parameters associated with the custom cut stock may be automatically transmitted to the AS 104. The AS 104 may then generate the machine readable code 112 for the custom cut stock that is ordered.

In one embodiment, the information or parameters associated with a custom cut stock may be provided from a user interface of the printing device 108 or an endpoint device (not shown). For example, a user may use a computer to transmit the information or parameters associated with the custom cut stock to the AS 104. The AS 104 may then generate the machine readable code 112 for the custom cut stock.

In one embodiment, the DB 106 may store various information. In one embodiment, the DB 106 may store the machine readable code 112 that is generated for a particular custom cut stock. As a result, if any of the printing devices 108 use the same custom cut stock and a request to generate, or create, the machine readable code 112 is received, the AS 104 may retrieve the machine readable code 112 from the DB 106. The machine readable code 112 may then be transmitted to the printing device 108 that requested the machine readable code 112. In another embodiment, the AS 104 may generate a new machine readable code 112 for each request associated with the custom cut stock.

In one embodiment, the DB 106 may store system settings for various different print jobs and information associated with custom cut stock that is used for the different print jobs. Thus, a user may access the DB 106 to find out if a print job was previously performed. If the print job was previously performed, the user may find out which custom cut stock was used for the print job. The user may order the custom cut stock and send a request to the AS 104 to generate the machine readable code 112 for the custom cut stock. In one embodiment, the AS 104 may determine the system settings for the print job associated with the custom cut stock and include the system settings in the machine readable code 112.

In one embodiment, the machine readable code 112 for each custom cut stock may be stored in the DB 106. The AS 104 may check the existing machine readable codes 112 stored in the DB 106 to ensure that a machine readable code 112 is not repeated when a new machine readable code 112 is requested. Thus, the DB 106 may be used to store and track machine readable codes 112 to ensure that unique codes are created for each new request for a machine readable code 112 for a custom cut stock.

Figure 2:
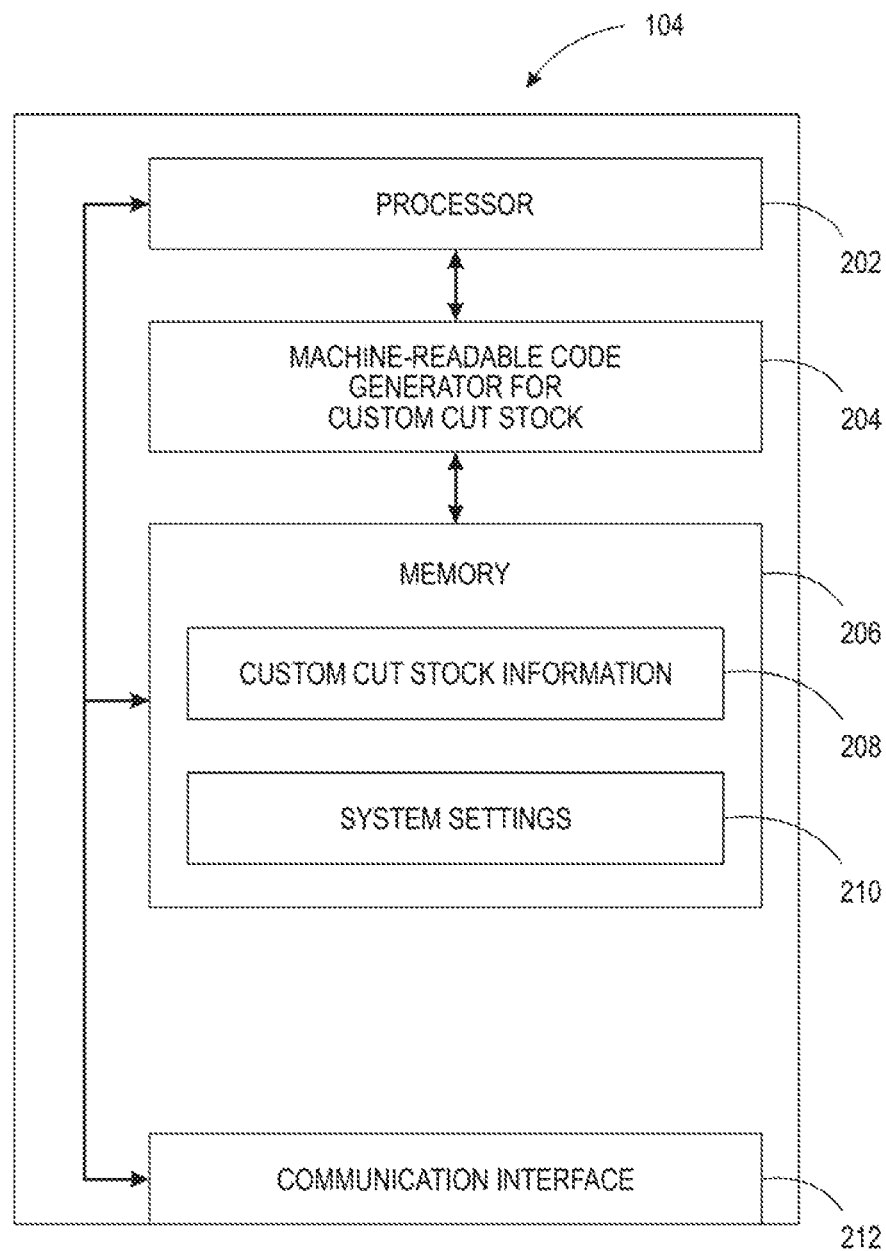
FIG. 2 illustrates a block diagram of an apparatus to generate machine-readable codes for custom cut stock of the present disclosure.

FIG. 2 illustrates a block diagram of an example of the AS 104 illustrated in FIG. 1. In one embodiment, the AS 104 may include a processor 202, a machine readable code generator for custom cut stock 204 (also referred to herein as the machine readable code generator 204), a memory 206, and a communication interface 212.

In one embodiment, the processor 202 may be communicatively coupled to the machine readable code generator 204, the memory 206, and the communication interface 212. The processor 202 may control operation of the machine readable code generator 204 and the communication interface 212. The communication interface 212 may be a wired (e.g., an Ethernet port) or wireless communication interface (e.g., a wireless radio).

The memory 206 may be any type of non-transitory computer readable medium (e.g., a random access memory (RAM), a hard disk drive, a solid state drive, and the like). The memory 206 may include custom cut stock information 208 and system settings 210. The custom cut stock information 208 and the system settings 210 may be received via the communication interface 212. For example, the custom cut stock information 208 may be transmitted from an endpoint device of a user, a user interface of the printing device 108, or from the custom cut stock ordering system 110. The system settings 210 may be transmitted from an endpoint device of a user or a user interface of the printing device 108.

In one embodiment, when the processor 202 receives a request to generate the machine readable code 112, the processor 202 may activate the machine-readable code generator 204. The machine-readable code generator 204 may obtain the information for the custom cut stock from the custom cut stock information 208. The machine-readable code generator 204 may also obtain system settings for the print job associated with the custom cut stock, if applicable, from the system settings 210 stored in the memory 206.

In one embodiment, a setup wizard or custom machine readable code generation interface may be displayed at a display of the printing device 108, an endpoint device of the user, or the custom cut stock ordering system 110. The setup wizard may guide the user through what information should be collected for the custom cut stock to generate the appropriate machine readable code 112. The custom cut stock information 208 and the system settings 210 may be received through the setup wizard.

The machine-readable code generator 204 may then generate the machine readable code 112. As noted above, the machine readable code 112 may be a bar code or a QR code. The machine readable code 112 may be scanned by a code scanner or reader at the printing device 108 to provide information associated with the custom cut stock to the printing device 108 automatically. The machine readable code 112 may be scanned to also automatically set one or more system settings or parameters of the printing device 108.

Figure 3:
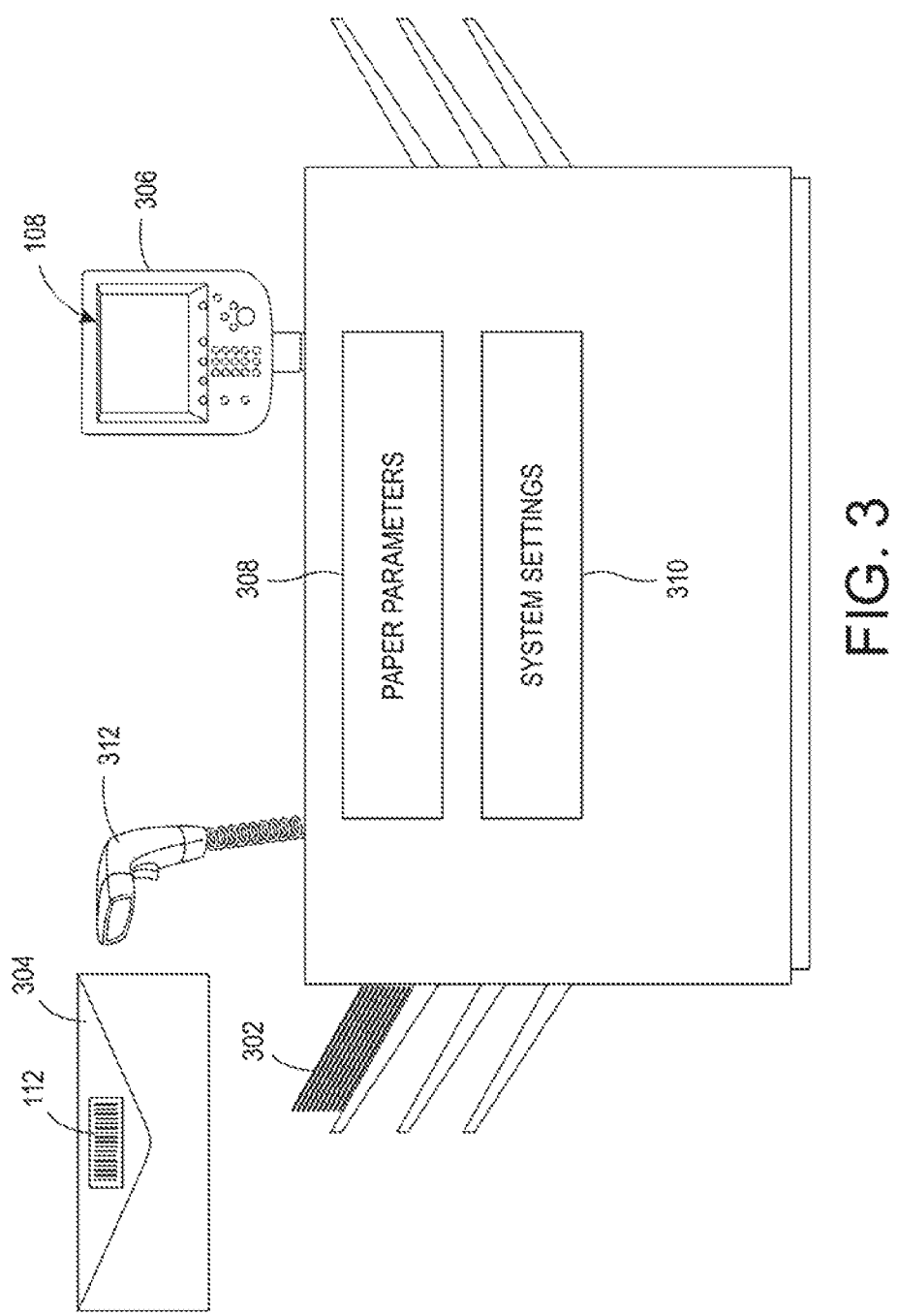
FIG. 3 illustrates a block diagram of a printing device that can be automatically programmed via the machine-readable code for the custom cut stock of the present disclosure.

FIG. 3 illustrates a block diagram of an example printing device 108. In one embodiment, the printing device 108 may include custom cut stock 302 that is loaded into a paper tray. The printing device 108 may also include a display 306, paper parameters 308, system settings 310, and a code reader 312. It should be noted that the printing device 108 has been simplified for ease of explanation and may include additional components that are not shown. For example, the printing device 108 may include paper transport paths, a printing component (e.g., a printheads, toner, fusers, and the like), a drying component (e.g., a blower, a UV energy source, and the like), a finishing component, a digital front end (DFE), and the like.

The display 306 may be a touch screen display, or may be a monitor that works with an external input device (e.g., a touch pad, mouse, keyboard, and the like). The display 306 may provide a graphical user interface (GUI) that allows a user to provide inputs and display outputs. In one example, the GUI may display fields associated with the paper parameters 308. The GUI may request that the values or data associated with the paper parameters 308 for the custom cut stock 302 to be entered in the GUI. The GUI may also provide menus and options to set the system settings 310. In one embodiment, the GUI may display the setup wizard discussed above to initiate a request to generate the machine readable code 112 for the custom cut stock 302.

As noted above, previously a user may manually enter the paper parameters 308 one-by-one in the GUI. However, the present disclosure generates, or creates, the machine readable code 112 for the custom cut stock 302. As noted above, the machine readable code 112 may be applied to the outside of a generic packaging 304 of the custom cut stock 302. In another example, the machine readable code 112 may be kept in a book with a plurality of machine readable codes 112 for different custom cut stocks.

The code reader 312 may be a bar code scanner, a QR reader, and the like. The code reader 312 may be communicatively coupled to the printing device 108 such that data read by the code reader 312 may be provided to the printing device 108. For example, the code reader 312 may scan the machine readable code 112. The coder reader 312 may obtain the information associated with the custom cut stock 302 to automatically provide values associated with the paper parameters 308. Thus, the printing device 108 may automatically enter values or data associated in the fields shown in the GUI for the paper parameters 308.

In addition, the code reader 312 may automatically provide the system settings 310 for the printing device 108 for a print job associated with the custom cut stock 302. For example, the print job may use a large amount of toner. Thus, the fuser temperature may be set to a relatively high temperature. In addition, the large amount of toner may take longer to dry. As a result, the blower may be kept on for a relatively long amount of time or powered at a higher blower speed.

Thus, the machine readable code 112 may be read by the code reader 312 to automatically provide values for the paper parameters 308 and/or the system settings 310. When a subsequent ream of the custom cut stock 302 is used in the print device 108, the user may simply scan the machine readable code 112 with the code reader 312. All of the pertinent information associated with the custom cut stock may be entered and, if appropriate, the system settings of the printing device 108 may be automatically configured.

Figure 4:
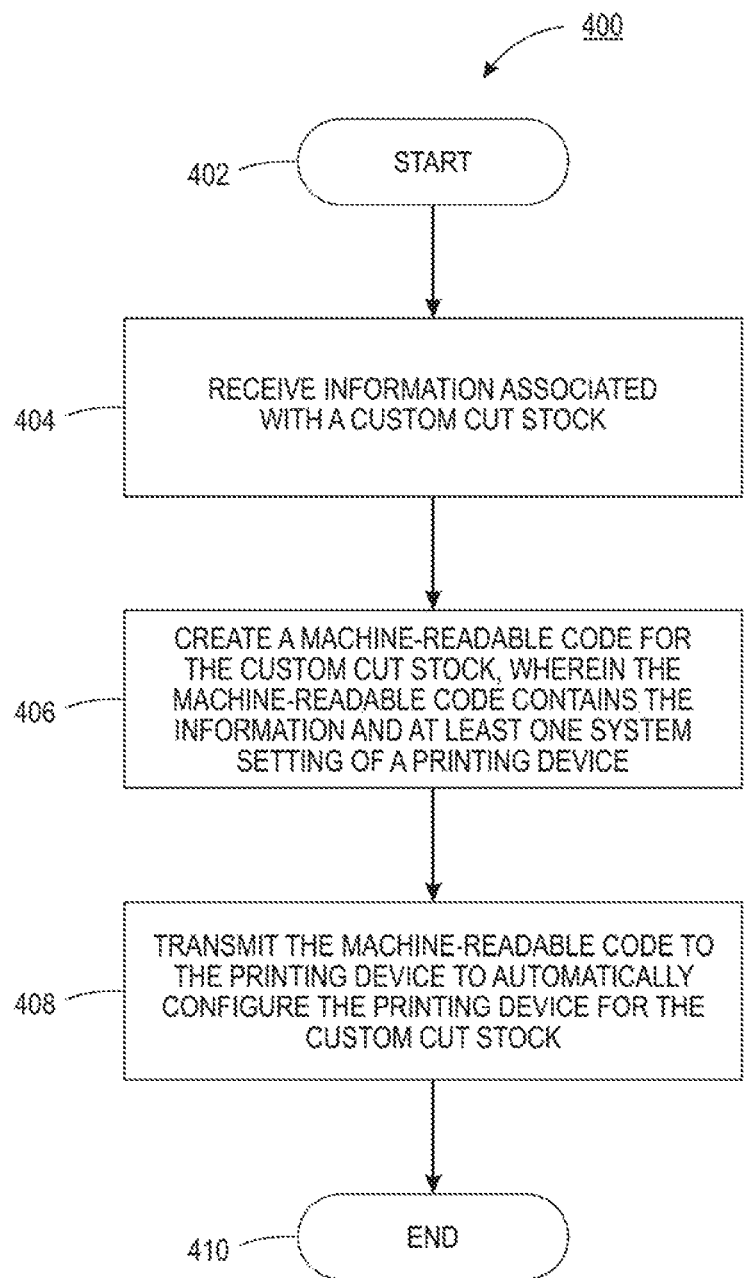
FIG. 4 illustrates a flowchart of an example method for creating a machine-readable code for custom cut stock.
Figure 5:
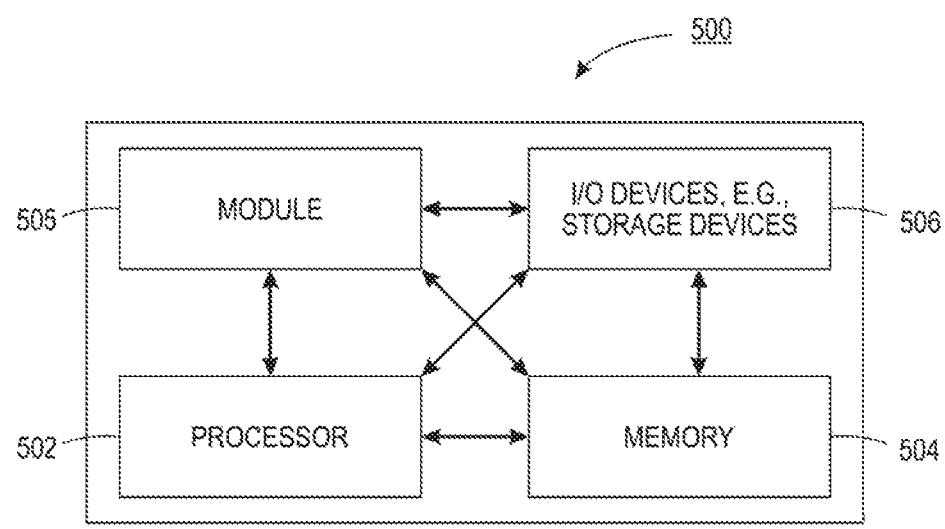
FIG. 5 illustrates a high-level block diagram of an example computer suitable for use in performing the functions described herein.

FIG. 4 illustrates a flowchart of an example method 400 for creating a machine-readable code for custom cut stock. In one embodiment, one or more blocks of the method 400 may be performed by the application server 104, or a computer/processor that controls operation of a printing apparatus as illustrated in FIG. 5 and discussed below.

At block 402, the method 400 begins. At block 404, the method 400 receives information associated with the custom cut stock. For example, the information may include various paper parameters such as a manufacturer, a paper size, a finish, a coating, a grain, a weight, a color, an indication of any pre-printed images, an indication of pre-punched holes, and the like.

The information may be received from an endpoint device of a user (e.g., a personal computer), a GUI on a display of a printing device or printing device, or a custom cut stock ordering system. For example, the printing device may be communicatively coupled to the AS that is executing the method 400. The information may be entered on the GUI shown on the display of the printing device.

In another example, the custom cut stock ordering system may be communicatively coupled to the AS that is executing the method 400. When the custom cut stock is ordered, the information associated with the order may be automatically transmitted to the AS.

At block 406, the method 400 creates the machine-readable code for the custom cut stock, wherein the machine-readable code contains the information and at least one system setting of a printing device. The machine-readable code may be a bar code or a QR code. The system setting may be an operational parameter of the printing device. For example, the operational parameters may include a fuser temperature, a blower speed, a blower on time, a feeding speed of the custom cut stock, and the like.

In one embodiment, the machine-readable code may be stored in a database that is communicatively coupled to the AS performing the method 400. The machine-readable code may be re-transmitted when requested or shared with another location or another printing device.

At block 408, the method 400 transmits the machine-readable code to the printing device to automatically configure the printing device for the custom cut stock. For example, the machine readable code is to be scanned by a code reader at the printing device to automatically enter the information into the printing device and set the at least one system setting of the printing device. The machine-readable code may be printed by the printing device. The machine-readable code may be applied to an outer side of the packaging of the custom cut stock or may be kept in a book containing a plurality of different machine readable codes associated with different custom cut stocks.

As a result, a user may scan the machine-readable code each time the custom cut stock is used in the printing device or printing device. The information associated with the custom cut stock may be automatically entered into the printing device. In addition, the system settings of the printing device for a print job associated with the custom cut stock may be automatically set based on information read from the machine-readable code. Thus, a user does not need to manually enter the paper information or set the system settings each time the custom cut stock is loaded and used in the printing device for a particular print job. At block 410, the method 400 ends.

FIG. 5 depicts a high-level block diagram of a computer that is dedicated to perform the functions described herein. As depicted in FIG. 5, the computer 500 comprises one or more hardware processor elements 502 (e.g., a central processing unit (CPU), a microprocessor, or a multi-core processor), a memory 504, e.g., random access memory (RAM) and/or read only memory (ROM), a module 505 for creating a machine-readable code for custom cut stock, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 505 for creating a machine-readable code for custom cut stock (e.g., a software program comprising computer-executable instructions) can be loaded into memory 504 and executed by hardware processor element 502 to implement the steps, functions or operations as discussed above in connection with the example method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for creating a machine-readable code for custom cut stock (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for creating a machine-readable code for a custom cut stock, comprising:
    receiving, by a processor, a request to create a machine-readable code for a custom cut stock at a user interface of a printing device that is communicatively coupled to an application server of the processor;
    receiving, by the processor, a manufacturer, a paper size, a finish, a coating, a weight, and a color associated with the custom cut stock from a user interface;
    receiving, by the processor, system settings for the printing device for a print job that is to be printed on the custom cut stock;
    creating, by the processor, the machine-readable code for the custom cut stock, wherein the machine-readable code contains the manufacturer, the paper size, the finish, the coating, the weight, and the color associated with the custom cut stock and the system setting of the printing device; and
    transmitting, by the processor, the machine-readable code to the printing device to be printed and scanned by the printing device when subsequent reams of the custom cut stock are loaded into the printing device to automatically provide the manufacturer, the paper size, the finish, the coating, the weight, and the color associated with the custom cut stock to the printing device and to automatically set the system settings of the printing device for the print job.

2. The method of claim 1, further comprising:
    storing, by the processor, the machine-readable code for the custom cut stock.

3. The method of claim 1, wherein the receiving further includes receiving an indication of any pre-printed images or an indication of pre-punched holes.

4. The method of claim 1, wherein the machine-readable code comprises a bar code.

5. The method of claim 1, wherein the machine-readable code comprises a quick response code.

6. The method of claim 1, wherein the system setting comprises an operational parameter of the printing device for a print job associated with the custom cut stock.

7. The method of claim 6, wherein the operational parameter comprises at least one of: a fuser temperature, a blower speed, a blower on time, or a feeding speed of the custom cut stock.

8. The method of claim 1, wherein the printing device is communicatively coupled to an application server of the processor and wherein the manufacturer, the paper size, the finish, the coating, the weight, and the color associated with the custom cut stock is received from a user interface at the printing device.

9. The method of claim 1, wherein the manufacturer, the paper size, the finish, the coating, the weight, and the color associated with the custom cut stock is received from the user interface of an ordering system when the information associated with the custom cut stock is entered for an order.

10. A non-transitory computer-readable medium storing a plurality of instructions, which when executed by a processor, causes the processor to perform operations for creating a machine-readable code for a custom cut stock, comprising:
   receiving a request to create a machine-readable code for a custom cut stock at a user interface of a printing device that is communicatively coupled to an application server of the processor;
   receiving a manufacturer, a paper size, a finish, a coating, a weight, and a color associated with the custom cut stock from a user interface;
   receiving system settings for the printing device for a print job that is to be printed on the custom cut stock;
   creating the machine-readable code for the custom cut stock, wherein the machine-readable code contains the manufacturer, the paper size, the finish, the coating, the weight, and the color associated with the custom cut stock and the system setting of the printing device; and
   transmitting the machine-readable code to the printing device to be printed and scanned by the printing device when subsequent reams of the custom cut stock are loaded into the printing device to automatically provide the manufacturer, the paper size, the finish, the coating, the weight, and the color associated with the custom cut stock to the printing device and to automatically set the system settings of the printing device for the print job.

11. The non-transitory computer-readable medium of claim 10, further comprising:
   storing the machine-readable code for the custom cut stock.

12. The non-transitory computer-readable medium of claim 10, wherein the receiving further includes receiving an indication of any pre-printed images or an indication of pre-punched holes.

13. The non-transitory computer-readable medium of claim 10, wherein the machine-readable code comprises a bar code.

14. The non-transitory computer-readable medium of claim 10, wherein the machine-readable code comprises a quick response code.

15. The non-transitory computer-readable medium of claim 10, wherein the system setting comprises an operational parameter of the printing device for a print job associated with the custom cut stock.

16. The non-transitory computer-readable medium of claim 15, wherein the operational parameter comprises at least one of: a fuser temperature, a blower speed, a blower on time, or a feeding speed of the custom cut stock.

17. The non-transitory computer-readable medium of claim 10, wherein the printing device is communicatively coupled to an application server of the processor and wherein the manufacturer, the paper size, the finish, the coating, the weight, and the color associated with the custom cut stock is received from a user interface at the printing device.

18. The non-transitory computer-readable medium of claim 10, wherein the manufacturer, the paper size, the finish, the coating, the weight, and the color associated with the custom cut stock is received from the user interface of an ordering system when the information associated with the custom cut stock is entered for an order.

* * * * *